United States Patent [19]

Tupper

[11] 4,352,330

[45] Oct. 5, 1982

[54] APPARATUS FOR SUSPENDING, LOCATING, MOVING OR FASTENING LOADS

[76] Inventor: Alan W. Tupper, The Weavers House, Castle Combe, Wiltshire SN14 7HX, England

[21] Appl. No.: 135,443

[22] Filed: Mar. 31, 1980

[30] Foreign Application Priority Data

Apr. 6, 1979 [GB] United Kingdom ................. 7912213

[51] Int. Cl.³ .......................... B61B 3/00; B61B 12/02
[52] U.S. Cl. ..................................... 104/96; 16/96 R; 104/1 R; 104/182; 188/65.1
[58] Field of Search ............... 104/1 R, 105, 106, 110, 104/96, 112, 115, 116, 141, 182, 184–186, 93; 191/76; 105/150; 188/65.1; 16/87 R, 94 R, 96 R

[56] References Cited

U.S. PATENT DOCUMENTS

| | | | |
|---|---|---|---|
| 506,037 | 10/1893 | Forbes | 104/182 |
| 878,653 | 2/1908 | Matthews et al. | 104/182 X |
| 904,119 | 11/1908 | Downs | 104/182 |
| 1,106,471 | 8/1914 | Opsal | 104/182 |
| 1,122,024 | 12/1914 | O'Connell | 104/182 |
| 1,295,485 | 2/1919 | Hall | 104/115 X |
| 1,429,007 | 9/1922 | Wilson | 104/182 |
| 1,772,005 | 8/1930 | Hoxie | 104/182 |
| 1,935,711 | 11/1933 | Hecox et al. | 105/150 X |
| 3,708,916 | 1/1973 | Karp, Jr. et al. | 104/105 X |
| 3,922,972 | 12/1975 | Junes | 104/112 X |

*Primary Examiner*—Randolph A. Reese
*Attorney, Agent, or Firm*—Scully, Scott, Murphy & Presser

[57] ABSTRACT

To provide an apparatus for suspending, moving or fastening a load or locating a member which is loaded in use and where in each case the load or loaded member may be required to be movable in use, the invention provides a mesh for location in a desired position for suspending or locating the load. An attachment device for the load comprises a wheel having a number of spaced recesses and a co-operating location member mounted on a peripheral part of the wheel with relatively rotatable bearing members therebetween to allow the wheel to rotate relative to the location member. The wheel is engaged with the mesh with its plane generally perpendicular to the mesh such that elements of the mesh are received, guided and passed in the recesses on the wheel as the wheel moves through the mesh while being located with respect to the mesh by the location member.

13 Claims, 7 Drawing Figures

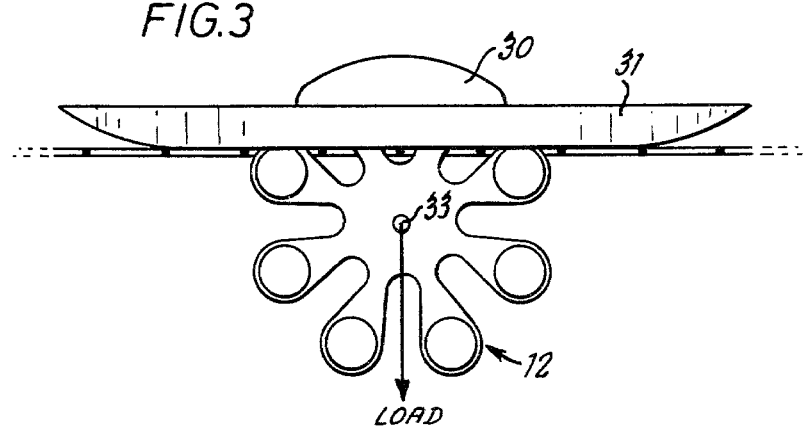
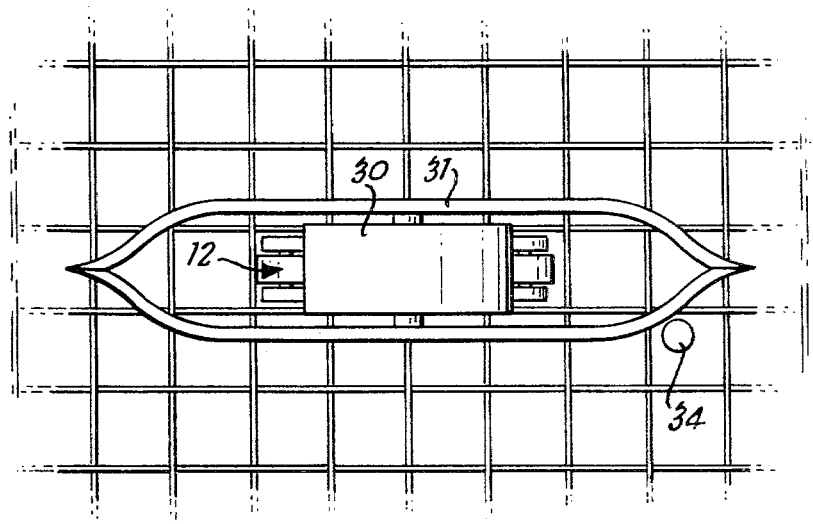

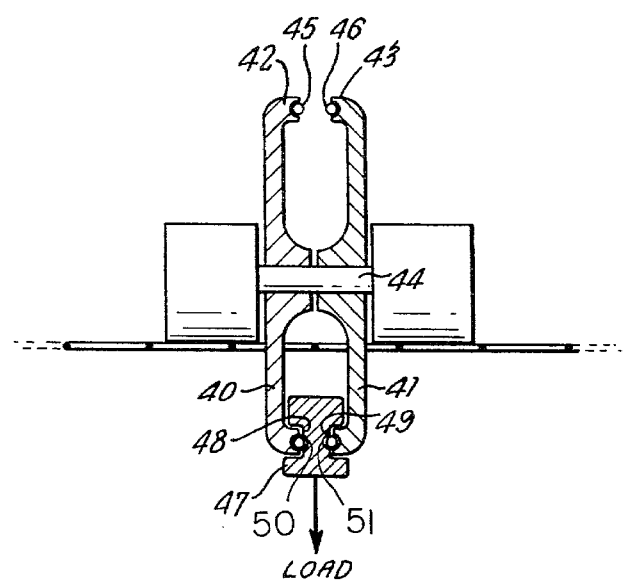

APPARATUS FOR SUSPENDING, LOCATING, MOVING OR FASTENING LOADS

FIELD AND BACKGROUND OF THE INVENTION

The invention relates to apparatus for suspending, locating, moving and fastening loads. An example of a specific use of such apparatus is for suspension of loads which are to be moved over a floor area of a factory or warehouse. However, embodiments of such apparatus can be used for suspending or locating relatively lighter loads or for effecting an attachment point above, below or to one side of a load including applications where the attachment is required to be movable in use.

Conventionally, loads have been moved round factory floors by using a system of overhead gantry cranes. Such systems require extremely rigid and heavy supporting rail structures on which the cranes run, which not only comprise massive structures but also can limit the positioning of, and therefore the area covered by the cranes. These limitations can be greater in some cases where such crane structures are required to be installed in already existing buildings. A further limitation with existing installations which the invention can overcome is in the small number of lifting devices that can be employed.

SUMMARY OF THE INVENTION

According to the invention there is provided apparatus suitable for use in suspending, locating, moving or fastening loads, which apparatus comprises a rigid or semi-rigid mesh, or other network formed of intersecting elongate elements (not necessarily straight), for location in a desired position for the suspension of a load therefrom or the attachment of a load thereto, and an attachment device engageable with the mesh for movement through the mesh, the device including means for attaching a load thereto, and comprising at least one rotatable wheel having recesses formed in its periphery at evenly spaced locations therearound and separated by projecting parts of the wheel, and a co-operating location member mounted on the wheel at a peripheral part of the wheel so as to form an integrated structure with the wheel while allowing rotation of the wheel about its axis with respect to the location member the arrangement being such that the wheel can be engaged with the mesh with the general plane of the wheel substantially perpendicular to the general plane of the mesh, and elements of the mesh are received, guided and passed in the recesses in the wheel as the wheel moves through the mesh while being located with respect to the wheel by the location member.

For some applications the attachment device may include more than one rotatable wheel and the wheels may or may not rotate together in unison.

Preferably the attachment device is provided with means for engaging and riding across the surface of the mesh remote from the load, as the device moves about the mesh. Such means may comprise elements adapted to roll or slide across the upper surface of the mesh.

In some embodiments of the invention said attachment device may be adapted such that the location member is located on the side of the mesh remote from the load with the axis of the wheel on the same side of the mesh as the load, said means for attaching a load being associated with the wheel of the attachment device. In such embodiments the location member may be provided with a sliding member which rides over the surface of the mesh remote from the load. This sliding member may be in the form of a boat-shaped ski having pointed opposite ends for engaging support structures for the mesh to deflect the attachment device to either side of such support structures when encountered during movement of the attachment device over the mesh. Other suitable deflecting devices may be provided to achieve this purpose. Similarly, such as deflecting arrangement can be fitted to a plurality of the attachment devices so that they are deflected to pass one other in an installation or into required directions.

In other embodiments of the invention the attachment device may be adapted such that the axis of the wheel is positioned in use on the side of the mesh remote from the load with the location member positioned on the same side of the mesh as the load, said means for suspending a load being associated with the location member. Means associated with the wheel may be provided for riding across the surface of the mesh remote from the load, which means may comprise rollers located on opposite sides of the wheel and attached to an axle thereof. Balls, discs hemispheres would also be suitable means to give a rolling effect. In some applications it may be desirable to provide drive means to rolling members located on opposite sides of the wheel for driving the attachment device across the mesh and such drive means may be capable of applying differential drive to each rolling member for steering the attachment device over the mesh. The steering means may be controlled remotely by an operator using any convenient control equipment, for example a universally movable "joy stick" for providing command signals for movement of the attachment device over the mesh. Programmed control of the movements of the attachment devices across the mesh using electrical inputs via the mesh itself can be provided. Many different means of powering the drive means are of course possible and indeed in many applications no power drive means will in practice be required.

In relatively light applications the wheel can comprise as few as three projecting parts defining therebetween three equi-angularly spaced recesses. However, in such applications the actual number of projecting parts and recesses is a matter of design choice. However, when heavier loads are to be suspended from the attachment device it is generally desirable to increase the number of recesses, for example using eight projecting parts defining eight recesses therebetween, and also in some cases to incorporate means for reducing frictional contact between the wheel or wheels and the location member when relative rotation between those parts takes place. In any particular application various parameters for example friction, strength of materials used, load to be carried, the gauge of the mesh, material stock from which the mesh is made etc., will have a bearing on the actual design adopted for the wheel, namely the shape and dimensions of the wheel and the number of projections.

Generally, the location member and the wheel or wheels will have interengaging male and female parts or surfaces which are shaped to permit the required relative rotation of the wheel and the location member. The location member may comprise an element which embraces a peripheral portion of the wheel with interengaging projections and recesses being provided between the side walls of the location member and the respective opposed side surfaces of the wheel. Such side surfaces of the wheel, at the tips of the projecting parts thereof, may be provided at each side with roller members rotatably mounted on the projecting parts and the location member may be provided with arcuate raceways formed in its side walls in which the rollers can run when the wheel rotates relative to the location member. In other arrangements, arcuate ball races may be provided either on the side walls of the projecting parts of the wheel, and engage in raceways on the location member, or such arcuate ball races may be provided on the internal surfaces of the side walls of the location member to be engageable with corresponding raceways provided on the opposed side walls of the projecting parts of the wheel. Other friction reducing devices may be provided for example bearing material may be provided on interengaging parts of the wheel and the location member.

Although the mesh will generally be located in a horizontal position above a work area, this is not essential. For example, the mesh could be vertical or inclined to the horizontal in some applications or indeed it may be other than a flat mesh such as a convex shape or possibly even a concave shape. Furthermore, the mesh may be located across a floor with said device serving to attach a load to the mesh, the load being above the mesh. Separate lines, which may be flexible or rigid, e.g. elongate tubes or rods or wires (not necessarily straight), may extend outwardly from the perimeter of the mesh so that loads may be collected from or moved to specific remote positions and moved into or out of the main mesh structure, e.g. for depositing at a required location on the floor area below the mesh structure, or indeed for movement across the mesh structure to another "spur" line leading to another specific remote location or collection area. Movement of an attachment device along a single elongate member is described in my corresponding U.S. application Ser. No. 021,967 now U.S. Pat. No. 4,265,179.

Possible applications of apparatus according to the invention apart from factories and warehouses are in television or film studios where cameras or lighting could be suspended from the mesh system for movement around the studio as well as shifting scenery. There may be specific horticultural uses, for example in greenhouses where an apparatus according to the invention would be suitable for use. It is also possible that there may be veterinary uses of the invention for example the suspension or harnesses for injured animals which will support the animals and allow them to move around a specific area beneath the mesh. The handling of heavy animals such as horses can be facilitated.

Embodiments of the invention may be used for relatively lightly loaded applications where the attachment devices may be relatively small and possibly made of a plastics material. For example, the attachment devices may be used for suspending hangers for garments in a cupboard or in a shop display thereby allowing unrestricted positioning of the garments in the cupboard and also movement of garments in a display for inspection by prospective customers. A further extension of the display may include separate lines extending from the periphery of the mesh so that garments can be withdrawn for inspection from the display and replaced without removing a hanger or garment from the suspension system.

Another application may be in batch process baking. The articles being processed in an oven may be suspended from a mesh in the oven so that they can be withdrawn on a line leading from the periphery of the mesh for another process step and then returned to the oven without detachment from the suspension system. A mesh system could also be applied to domestic cooking by providing a simple form of accessory allowing spit roasting.

A further application is a system using attachment devices which may, in some applications, be relatively small e.g. coin size, and which may have locking means provided on the wheel for clamping it firmly to the mesh. Such means could be in the form of a locking or clamping member provided on the wheel with overcenter cams allowing such bar to be moved to a clamping position whereby the mesh is firmly gripped between the locking bar and another part, e.g. the aforesaid ski device, of the attachment device located on the opposite side of the mesh. In other embodiments, other types of locking members may be used, e.g. a pair of co-operating discs which can be made to clamp against the mesh. In this way articles can be fastened in required positions simply by feeding the wheel of an attachment device into the mesh, moving it to the required position and then locking the device using the locking means. This could obviate the need for nuts and bolts for effecting a fastening and could be particularly advantageous in relatively inaccessible locations. In further similar applications, the mesh may be located at or adjacent to floor level to provide a fastening at such position which can be adjusted. An example is a fastening for a tubular forestay for a jib sail the mesh being attached to the deck. The position of the forestay is therefore adjustable to allow infinite adjustment of the sail. A similar application may be for controlled two-dimensional movement across a floor where the movable object is attached to a mesh located over the floor. An example of this might be in Tactical Teachers, namely devices for giving representational movement so as to instruct people such as sonar operators, radar operators, air traffic controllers etc. A similar further application could be for adjustable shelving, with the shelf support fastened to a mesh attached to a wall by lockable attachment devices according to this invention.

A yet further possible application of apparatus according to the invention is in the field of "robotics", namely computer controlled "robot" or mechanical slave manufacturing equipment or other equipment that requires random or controlled movement in three planes. Apart from manufacturing equipment another example of such an application could be the handling of radioactive material. At present such equipment generally utilizes robots in the form of wheeled vehicles movable across a floor area. Instead, according to the invention, a robot may be located with respect to and movable across a mesh which can be positioned to leave the floor area completely clear.

BRIEF DESCRIPTION OF THE DRAWINGS

FIG. 3 is a side view of a second embodiment of the invention;

FIG. 4 is a plan view of the embodiment of FIG. 3;

FIG. 5 is a section through a third embodiment;

DETAILED DESCRIPTION

Figure 1:
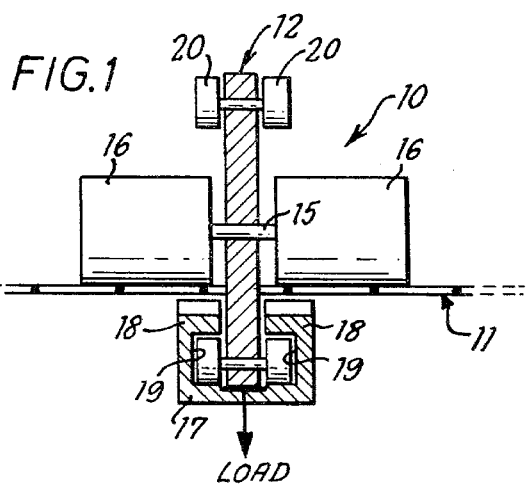
FIG. 1 is a section through one embodiment of the invention.
Figure 2:
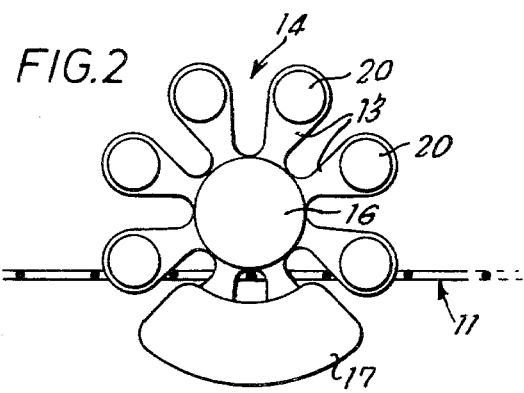
FIG. 2 is a side view of the attachment device of FIG. 1.

Referring to FIGS. 1 and 2 of the drawings, there is shown an attachment device 10 for cooperating with a mesh structure, a part of which 11 is shown in FIG. 1, which is suspended above a work floor. The attachment device 10 comprises a wheel 12 which, as seen in FIG. 2, has eight radially projecting parts 13 which define therebetween eight recesses 14 extending inwardly of the periphery of the wheel. The wheel is rotatable about an axle 15 which is connected to a pair of cylindrical roller members 16 located one on each side of the wheel. The rollers 16 contact the upper surface of the mesh 11 and run across such mesh when the device is moved through the mesh.

A location member 17 is positioned at a peripheral part of the wheel and has a pair of side walls 18 which embrace a peripheral part of the wheel. The internal surface of walls 18 are formed with arcuate raceways 19 which are shaped to receive roller elements 20, rotatably mounted at the tip portion and on each side of each projection 13 of the wheel. The interengagement of the rollers 20 and the raceway 19 locate the location member with respect to the wheel while allowing relative rotation of the wheel with respect to the location member 17.

A load is suspended in use from the location member 17 and can be moved in any direction across the mesh either by applying pressure to the load itself in relatively simple constructions or by providing a power drive to the roller 16 which may be able to drive such rollers independently when required for steering purposes.

The elements of the mesh extending transverse to the plane of the wheel 12 are received in respective recesses 14 in the wheel and pass through the attachment device 10 by rotation of the wheel about its axis relative to the location member 17.

The wheel is made of a suitable material, e.g. stainless steel, by a machining, pressing, forging or casting process or in lighter uses could be molded from a durable plastics material such as nylon. The location member is likewise made of metal or a plastics material and may be formed in two halves which are joined together by a suitable process, e.g. welding or riveting.

FIGS. 3 and 4 show a second embodiment in which the axis of the wheel 12 is positioned below the level of the mesh. In this embodiment the location member 30 is located above the level of the mesh and is provided with a boat shaped ski device 31 formed of two pieces of shaped strip metal extending on either side of the guide member 30 and being curved at respective ends towards one another and welded together to form pointed ends.

In this embodiment the load is attached to the wheel 12, for example by a yoke extending outwardly of an axle 33 about which the wheel is rotatable. During operating the ski device 31 rides over the upper surface of the mesh and has the advantage that when it encounters a structural support member 34 supporting the mesh from a roof or other overhead structure it engages such structural member to deflect the attachment device 10 in a direction past the structural member.

FIG. 5 shows a third embodiment in which the attachment device has two recessed wheels 40, 41 which are similar to wheels 12 of the previous embodiments, except that the projecting parts of the wheels have axially extending curved flanges 42, 43 at their free ends. The wheels 40, 41 are each fixed to rotate on that axle. The latter arrangement will allow easier and smoother turning of the device in some practical applications. The flanges 42, 43 project towards one another and have curved ball races 45, 46 located in recesses provided in their opposed surfaces. A location member 47 is located between the wheels 40, 41 and has curved recesses 48, 49 in its side surfaces in which the flanges 42, 43 of the wheels engage respectively. The bottoms of the recesses 48, 49 are formed with raceways 50, 51 on which the balls, which are retained in and project from the flange recesses 42, 43, run when the wheels rotate relative to the location member.

Figure 6:
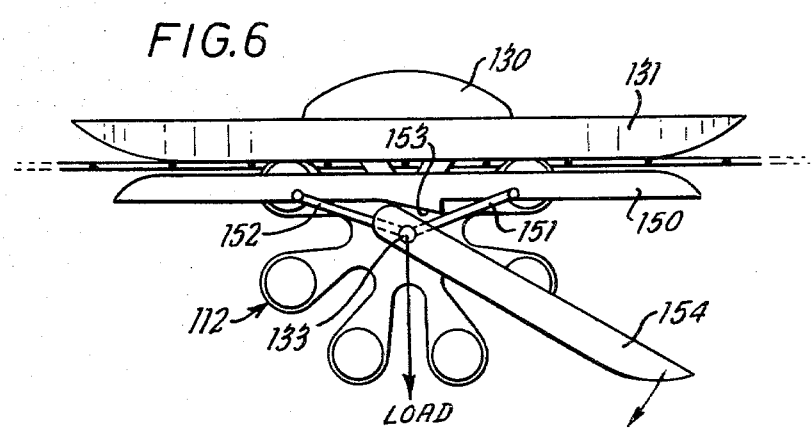
FIG. 6 is a section through a fourth embodiment.

FIG. 6 illustrates an apparatus embodying the invention adapted to provide a fastening means. The mesh may be located in any required position, e.g. overhead, on a floor, on a wall, such that one or more attachment devices 112 can be fed into the mesh at the periphery thereof. The attachment devices 112 shown are similar to those shown in FIGS. 3 and 4 except that a locking bar 150 is mounted by a pair of connecting struts 151, 152 each pivotally connected at its ends to the bar 150 and the axle 133 of the wheel as shown in FIG. 6. The bar is provided with an over-center cam device in the form of a wedge-shaped abutment 153 on the underside of the bar 150 and an actuating lever 154 pivotally mounted on the axle 133. The bar can be made to bear against the mesh by pulling downwardly on the longer arm of the lever so that its short arm cooperates with the lower ramp surface of the abutment forcing the bar 150 upwards to clamp the mesh between the bar and the ski-device 131. The attachment device and a load suspended from it can be fastened thereby in any required position on the mesh. Many other forms of locking devices for clamping the attachment device to the mesh are of course possible. Moreover, in other possible embodiments, instead of rollers on the leaves, there may be relatively rotatable, interlocking bearing surfaces on the wheel and the location member 130. If the parts of the attachment device are made of a suitable plastics material no additional bearing material may be required between the interlocking parts of the wheel and location member.

Figure 7:
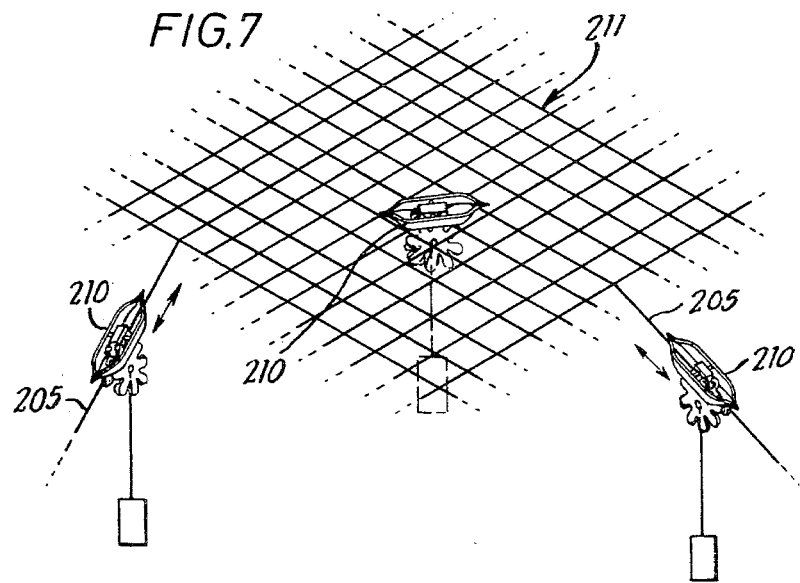
FIG. 7 is a schematical view of the fifth embodiment.

FIG. 7 illustrates an embodiment of the invention in which spur lines 205 extend from the periphery of the mesh 211. Attachment devices 210 suspending, for example containers movable across a factory floor, can be moved along these spur lines to remote stations at which specific operations are performed on the containers, for example, loading and unloading operations, and they are then returned to the mesh without detachment from the suspension system. In this embodiment the attachment devices may for example be in the form of two wheels having a location member positioned therebetween as on the embodiment of FIG. 5, except that in this case the location member is above the mesh and the load is suspended from the axle of the wheels. A ski-device may be provided on the location member to slide across the upper surface of the mesh. When the attachment device moves onto a spur line, that line extends between the two wheels and engages the underside of the location member.

What is claimed is:
1. A system for locating a load from a support area, which system comprises:
(a) a longitudinally and laterally extensive network formed of a first series of rigid or semi-rigid, generally parallel elongate elements and a second series of rigid or semi-rigid, generally parallel elongate ele- ments extending transversely of the elements of the first series, for location in a desired position for the attachment of a load thereto, and
(b) an attachment device comprising
 (i) at least one rotatable wheel which is formed with recesses in its periphery to receive elements of the network, the recesses being evenly spaced around the wheel and adjacent recesses being separated by a projecting part of the wheel and the wheel being engaged with the network with the general plane of the wheel substantially perpendicular to the general plane of the network,
 (ii) a location member mounted on the wheel at a peripheral part thereof, and on the side of the network remote from the axis of the wheel, the wheel and the location member having cooperating relatively rotatable surfaces allowing the wheel to rotate about its axis relative to the location member with said elongate elements of either series thereof being received, guided and passed in at least one of said recesses while being located with respect to the wheel by the location member,
 (iii) means to attach a load to the location member, and
 (iv) means mounted on the wheel, bridging a plurality of said elongate elements of the network to bear against and to ride over surface areas of the network on both sides of the wheel, on the side of the network remote from the location member,
the spacing of the elongate elements in both said series thereof being arranged to provide continuous engagement with the attachment device while said means mounted on the wheel continuously bear against and ride over the surface of the network remote from the location member.

2. A system according to claim 1, wherein said means mounted on the wheel comprise rotary members located on opposite sides of the wheel and attached to an axle thereof.

3. A system according to claim 1 wherein the location member comprises an element which embraces a peripheral portion of the wheel with interengaging projections and recesses being provided between side walls of the location member and respective opposed side surfaces of the projecting parts of the wheel.

4. A system according to claim 1, wherein said device includes two rotatable wheels and the location member is disposed between peripheral portions of the wheels and the wheels and location member have interlocking relatively rotatable male and female parts.

5. A system according to claim 1, including at least one individual elongate element extending outwardly from the periphery of the network to allow the attachment device to move between the network and a station remote from the network without detachment.

6. A system for locating a load from a support area, which apparatus comprises:
(a) a longitudinally and laterally extensive network formed of a first series of rigid or semi-rigid generally parallel elongate elements and a second series of rigid or semi-rigid generally parallel elongate elements extending transversely of the elements of the first series, for location in a desired position for the attachment of a load thereto, and
(b) an attachment device comprising:
 (i) at least one rotatable wheel which is formed with recesses in its periphery to receive elements of the network, the recesses being evenly spaced around the wheel and adjacent recesses being separated by a projecting part of the wheel and the wheel being engaged with the network with the general plane of the wheel substantially perpendicular to the general plane of the network,
 (ii) a location member mounted on the wheel at a peripheral part thereof and on the side of the network remote from the axis of the wheel, the wheel and the location member having cooperating relatively rotatable surfaces allowing the wheel to rotate about its axis relative to the location member with said elongate elements of either series thereof being received, guided and passed in at least one of said recesses while being located with respect to the wheel by the location member,
 (iii) means to attach a load to the wheel, and
 (iv) means associated with the guide member, bridging a plurality of said elongate elements of the network to bear against and to ride freely over the surface of the network remote from the axis of the wheel when the attachment device is moved through the network,
the spacing of the elongate elements in both said series thereof being arranged to provide continuous engagement with the attachment device while said means associated with the guide member continuously bear against and freely ride over the surface of the network remote from the axis of the wheel.

7. A system according to claim 6 wherein said means associated with the guide member comprise a sliding member providing sole support for the attachment device with respect to the network.

8. A system according to claim 7, wherein the sliding member is in the form of a ski having pointed opposite ends to deflect the attachment device past supporting structures of the network or other attachment devices engaged therewith.

9. A system according to claim 6, wherein means are provided on the attachment device to deflect the device with respect to structures supporting the network or other attachment devices engaged with the network.

10. A system according to claim 6 wherein the location member comprises an element which embraces a peripheral portion of the wheel with interengaging projections and recesses being provided between side walls of the location member and respective opposed side surfaces of the projecting parts of the wheel.

11. A system according to claim 6, wherein said device includes two rotatable wheels and the location member is disposed between peripheral portions of the wheels and the wheels and location member have interlocking relatively rotatable male and female parts.

12. A system according to claim 6 including means on said attachment device which can be actuated to lock the device to the network and comprising a locking member mounted on the wheel and means to actuate the locking member to engage it with the network whereby the network is firmly sandwiched between the locking bar and a part associated with the attachment device, which part is located in use on the opposite side of the network to the locking member.

13. A system according to claim 6, including at least one individual elongate element extending outwardly from the periphery of the network to allow the attachment device to move between the network and a station remote from the network with detachment.

* * * * *